US012784970B2

(12) United States Patent
Njiende et al.

(10) Patent No.: US 12,784,970 B2
(45) Date of Patent: Nov. 3, 2026

(54) MAGNETIC COMPONENT WITH A FRINGING FIELD SHIELDING DEVICE

(71) Applicant: Delta Electronics (Thailand) Public Co., Ltd., Samutprakarn (TH)

(72) Inventors: Hugues Njiende, Paderborn (DE); Ralf Grieger, Soest (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 947 days.

(21) Appl. No.: 17/938,670

(22) Filed: Oct. 6, 2022

(65) Prior Publication Data

US 2023/0109971 A1 Apr. 13, 2023

(30) Foreign Application Priority Data

Oct. 7, 2021 (EP) .................................... 21201510

(51) Int. Cl.
*H01F 27/36* (2006.01)
*H01F 27/24* (2006.01)
*H01F 27/30* (2006.01)

(52) U.S. Cl.
CPC ........... *H01F 27/366* (2020.08); *H01F 27/24* (2013.01); *H01F 27/306* (2013.01)

(58) Field of Classification Search
CPC ...... H01F 27/366; H01F 27/24; H01F 27/306; H01F 27/263; H01F 3/14
See application file for complete search history.

(56) References Cited

U.S. PATENT DOCUMENTS 6,967,553 B2 * 11/2005 Jitaru .................... H01F 27/346 336/212
10,643,782 B2 * 5/2020 Zhou ....................... H01F 17/04
2002/0039062 A1 4/2002 Kvarnsjo et al.
2007/0188284 A1 8/2007 Dobbs
(Continued)

FOREIGN PATENT DOCUMENTS

CN 101636800 A 1/2010
CN 103559978 A 2/2014
(Continued)

OTHER PUBLICATIONS

Corresponding extended European search report issued on Mar. 31, 2022.
(Continued)

*Primary Examiner* — Shawki S Ismail
(74) *Attorney, Agent, or Firm* — CKC & Partners Co., LLC

(57) ABSTRACT

The disclosure concerns a magnetic component and a power converter including the same. The magnetic component includes at least one magnetic core, where at least one gap is formed between end surfaces, especially opposing end surfaces, of the magnetic core(s). The magnetic component further includes at least one electrical winding surrounding at least a part of the at least one magnetic core, and a shielding device for shielding fringing fields of the at least one gap. The shielding device includes: a holding unit attached to the at least one magnetic core and/or to the at least one electrical winding in a periphery of the at least one gap; and at least one shield member attached to the holding unit. The at least one shield member is configured to shield gap fringing fields in the periphery of the gap.

19 Claims, 11 Drawing Sheets

(56) References Cited

U.S. PATENT DOCUMENTS

| | | | | |
|---|---|---|---|---|
| 2012/0326831 | A1* | 12/2012 | Suzuki | H01F 27/263 336/233 |
| 2014/0085040 | A1* | 3/2014 | Cho | H01F 27/36 336/84 R |
| 2014/0159499 | A1 | 6/2014 | Dobbs | |
| 2015/0213944 | A1 | 7/2015 | Kuroda et al. | |

FOREIGN PATENT DOCUMENTS

| | | | | |
|---|---|---|---|---|
| CN | 103748642 | A | 4/2014 | |
| CN | 108257768 | A | 7/2018 | |
| DE | 10042283 | A1 | 3/2002 | |
| EP | 2216793 | A2 * | 8/2010 | H01F 27/363 |
| EP | 3800766 | A1 | 4/2021 | |
| JP | 4279647 | B2 | 6/2009 | |
| WO | WO-2012001398 | A2 * | 1/2012 | H01F 27/2804 |

OTHER PUBLICATIONS

Corresponding China Office Action issued on Apr. 25, 2025 with its English translation. (15 pages).

Corresponding European Office Action issued on Mar. 19, 2025. (3 pages).

The Notice of Allowance of corresponding Chinese application No. 202211214922.3, dated Sep. 30, 2025.

* cited by examiner

MAGNETIC COMPONENT WITH A FRINGING FIELD SHIELDING DEVICE

CROSS-REFERENCE TO RELATED APPLICATIONS

This application claims priority to European Patent Application No. 21201510.1, filed on Oct. 7, 2021, which is hereby incorporated by reference in its entirety.

TECHNICAL FIELD

The present disclosure concerns a magnetic component with a fringing field shielding device, and a power converter including the same.

BACKGROUND

Conventional magnetic components, for example for power converters, include one or more magnetic cores and one or more electrical windings. Therein, air gaps in these magnetic cores or between multiple magnetic cores are used in order to control the inductance or to increase the saturation current of the magnetic component. It is commonly known that air gaps in the magnetic cores lead to air gap fringing fields, which can induce alternating current (AC) losses in adjacent components or lead to heat generation, especially at high frequencies. In addition, the fringing fields can severely affect the electromagnetic interference (EMI) behavior of the magnetic component, as well as of a device containing the magnetic component. These air gaps are conventionally surrounded by copper windings which serve as shields for the magnetic fringing fields generated in a periphery of the air gap. However, the fringing fields induce high alternating current (AC) losses, particularly at high frequencies. To mitigate this, conventionally, expensive litz wires are employed to reduce AC copper losses. Another approach to reduce the air gap induced AC losses is to distance the winding from the air gap. This approach, however, leads to high direct current (DC) losses and increased component volume. A further approach to reduce winding AC losses is to provide copper winding that does not surround the air gaps. This approach, however, has the disadvantage that the air gap fringing fields are not shielded by the copper winding. Further, distancing the magnetic components with non-shielded air gaps to adjacent components in order to decrease AC losses or heat generation in the adjacent components leads to a lower device power density, and is thus also disadvantageous. This distancing can also increase a thermal resistance to a chassis holding the magnetic component and can thus lead to even further temperature increases of the device.

CN 108257768 A discloses a stray flux shielding structure for a differential common mode integrated inductor. Therein, one magnetic core portion is formed so as to include a demagnetizing shield portion around an air gap produced by connecting said magnetic core portion with an E-shaped magnetic core portion. However, this approach has the disadvantage that the magnetic core portions of such a magnetic component must be completely redesigned in order to provide such an integral demagnetization shield. Further, especially due to the bulk magnetic shielding structure described therein being made of the same material as the magnetic core portions thereof, a magnetic short circuit via the bulk magnetic shielding structure is highly likely, thus causing power losses and disadvantageous heat generation therein.

JP 4279647 B2 discloses a magnetic line shielding mechanism of an electromagnet. Therein, a pair of shield members are provided on sides of an air gap so as to sandwich the air gap. However, the shield members are formed of a non-magnetic material having conductivity. Therefore, the shield members described therein are not suitable for shielding magnetic fringing fields of the air gap. Further, eddy currents generated in these shield members greatly increase the heat generation of such a magnetic component. In addition, the complexity of providing such shield members necessitates the need to redesign the magnetic component, especially the placement of electrical winding therein.

SUMMARY

Embodiments of the present disclosure provide a magnetic component with a shielding device which can shield fringing fields of a gap formed between one or more magnetic core(s) and which can be easily applied without necessitating complex redesigns of the magnetic component.

The solution of the embodiments is solved by the features of the independent claim. The dependent claims contain further advantageous embodiments of the present disclosure.

The present disclosure concerns a magnetic component including at least one magnetic core and at least one electrical winding surrounding at least a part of the at least one magnetic core. Therein, at least one gap is formed between end surfaces, especially opposing end surfaces, of the one or more magnetic core(s). The magnetic component further includes a shielding device for shielding fringing fields of the at least one gap. The shielding device includes a holding unit attached to the at least one magnetic core and/or to the at least one electrical winding in a periphery of the at least one gap. Further, the shielding device includes at least one shield member attached to the holding unit, where the at least one shield member is configured to shield gap-fringing fields in the periphery of the gap.

The disclosure further relates to a power converter, specifically a switched mode power converter, including at least one magnetic component as claimed or described herein.

BRIEF DESCRIPTION OF DRAWINGS

Further details, advantages, and features of the embodiments of the present disclosure are described in detail with reference to the figures. Therein.

REFERENCE SIGNS

Figure 1A:
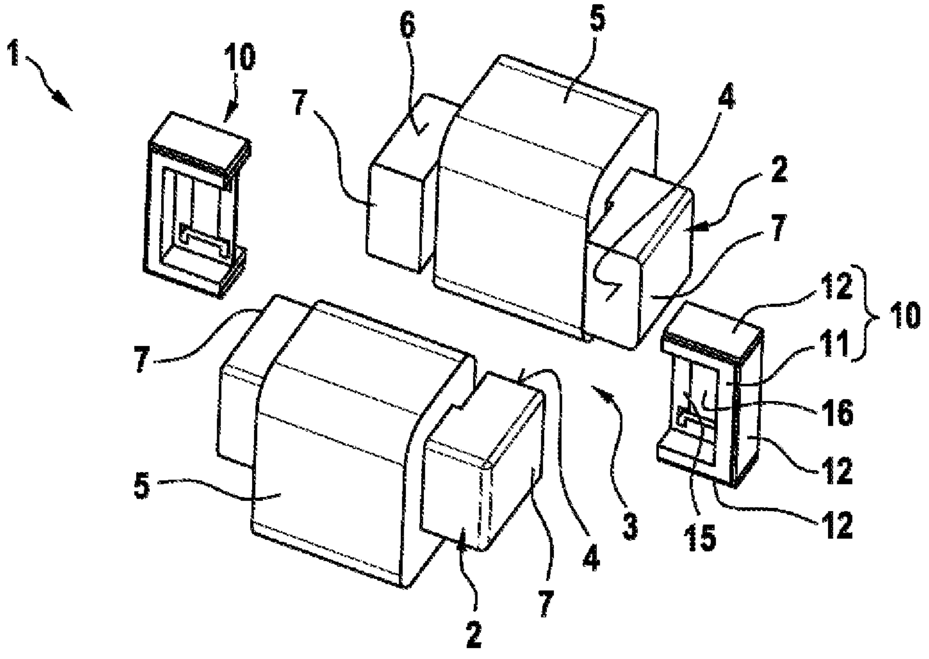
FIGS. 1*a* and 1*b* show schematic views of a magnetic component according to a first embodiment of the present disclosure, respectively in a pre-assembled state and in an assembled state.

1—magnetic component; 2—magnetic core; 3—gap; 4—end surface; 5—electrical winding; 6—outside surface; 7—leg portion; 10—shielding device; 11—holding unit; 12—shield member; 13—side surface; 14—receiving portion; 15—spacing portion; 16—opening; 17—shield member spacer; 18—notch; 19—closest edge; 20—core plate; 21—receptacle; and 22—partition wall.

DESCRIPTION OF EMBODIMENTS

In the following explanations and drawings, functionally similar or equal features and elements have the same reference numerals and a repeated explanation of these may be omitted.

Embodiments of the present disclosure provides a magnetic component including at least one magnetic core and at least one electrical winding surrounding at least a part of the at least one magnetic core. Therein, at least one gap is formed between end surfaces, especially opposing end surfaces, of the one or more magnetic core(s). The magnetic component further includes a shielding device for shielding fringing fields of the at least one gap. The shielding device includes a holding unit attached to the at least one magnetic core and/or to the at least one electrical winding in a periphery of the at least one gap. Further, the shielding device includes at least one shield member attached to the holding unit, where the at least one shield member is configured to shield gap-fringing fields in the periphery of the gap.

In an implementation, the holding unit is attached only to the at least one magnetic core. In an implementation, the holding unit is not manufactured integrally with the magnetic core, but is an independent component that is attached to the at least one magnetic core and/or the at least one electrical winding. For example, it is clamped on and/or glued on the at least one magnetic core and/or the at least one electrical winding.

In an implementation, the holding unit is one-piece, for example injection molded.

In an implementation, the shield member(s) is/are made of a different material than the holding unit. In an implementation, the shield member(s) is/are an independent element that is attached to the holding unit. For example, it is clamped on and/or glued on the holding unit or the shield member(s) is/are overmolded (injection molding procedure) by the holding unit.

In an implementation, one to ten shield members are attached to a single holding unit. In another implementation, one to four shield member are attached to a single holding unit. In an implementation, the single shield member is a plate-shaped element.

In an implementation, the shield member(s) is/are positioned on an outside of the holding unit, so that the holding unit is positioned between the shield members(s) and the magnetic core(s).

The magnetic component of the embodiments of the present disclosure has the advantage that fringing fields of the at least one gap can be shielded by the at least one shield member. In addition, the holding unit for the at least one shield member provides an easy means with which the at least one shield member can be provided in a periphery of the at least one gap.

In an implementation, the holding unit includes at least one side surface configured to at least partially surround the gap and to hold the at least one shield member. This has the advantage that the shielding device can be easily assembled and the at least one shield member thereof can be reliably held by the holding unit.

In an implementation, the magnetic core(s) is/are partially or fully circumferentially surrounded by the side surface(s) of the holding unit. In an implementation, the holding unit includes three or four side surfaces.

In an implementation, the holding unit is attached between the end surfaces of the magnetic core(s). In other words, in an implementation, the holding unit is attached between the end surfaces of one magnetic core or between the end surfaces of multiple magnetic cores. This has the advantage that the holding unit can be easily attached in a periphery of the at least one gap. Further, the holding unit can thereby suitably attach to a plurality of designs of the magnetic core(s).

Advantageously, for attaching the holding unit between the end surfaces, the holding unit includes a receiving portion which is configured to receive one of the end surfaces. In an implementation, the receiving portion is disposed between multiple side surfaces of the holding unit. In an implementation, the inner space defined by multiple side surfaces, forms the receiving portion. In an implementation, the inner space defined by three or four side surfaces forms the receiving portion. In an implementation, the side surfaces of the holding unit rest on parts of the outer surfaces of the magnetic cores(s); where these parts of the outer surfaces are directly adjacent to the end surfaces.

In an implementation, the holding unit includes a further (additional) receiving portion, especially between multiple side surfaces of the holding unit, configured to receive the opposing end surface. In an implementation, the inner space defined by multiple side surfaces forms the further receiving portion. In an implementation, the inner space defined by three or four side surfaces forms the receiving portion. In an implementation, the side surfaces of the holding unit rest on parts of the outer surfaces of the magnetic cores(s); where these parts of the outer surfaces are directly adjacent to the end surfaces.

In other words, the holding unit may include a single receiving portion configured to receive one of the end surfaces. In an implementation, the holding unit may include an additional receiving portion, which is configured to receive the end surface opposing the one of the end surfaces received by the other receiving portion. With this, the holding unit has the advantage of being easily and reliably attached between the end surfaces of the magnetic core(s).

In an implementation, each side surface of the holding unit extends over the gap and both end surfaces, so that each side surface can form part of both receiving portions.

In a further embodiment, the holding unit is attached only to an outside surface and not to an end surface of the magnetic core(s). In an implementation, such a holding unit is used at the middle-gap of an EE configuration. In other words, the holding unit includes—instead of the receiving portions—two opposing side surfaces, which embrace the magnet core(s) on two opposing outside surfaces. In an implementation, therein, the holding unit is attached either to an outside surface of one magnetic core, or to an outside surface formed by outside surfaces of multiple magnetic cores. This has the advantage that the holding unit can be attached to the magnetic core(s) irrespective of the design of the magnetic core(s). In addition, the holding unit can thereby act as a spacer for spacing the electrical windings from each other.

In an implementation, the holding unit is snap-fit onto the outside surface of the at least one magnetic core. This has the advantage that the holding unit can be easily and reliably attached to the magnetic core(s), especially irrespective of the design of the magnetic core(s) and irrespective of a placement of the at least one electrical winding surrounding the magnetic core(s). In an implementation, the holding unit is snap-fit onto an outside surface of the at least one electrical winding.

In an implementation, the holding unit includes at least one spacing portion protruding into the gap and separating the at least two end surfaces opposite to each other with respect to the spacing portion. In an implementation, the at least one spacing portion protrudes from the at least one side surface of the holding unit into the gap. Thereby, the holding unit can gap at least two opposing end surfaces of the magnetic core(s).

In an implementation, the spacing portion is frame-shaped. Therein, an air gap is defined in the gap between the end surfaces by an opening of the frame-shaped spacing portion. In an implementation, the frame-shaped spacing portion is of a round ring shape or of a rectangular ring shape. In other words, in an implementation, the spacing portion has an opening, especially in the center thereof, which defines an air gap in the gap between the opposing end surfaces of the magnetic core(s). This has the advantage that the holding unit can have little to no effect on an inductance of the magnetic core(s) as compared to the case of the gap between the end surfaces thereof being an air gap.

In another advantageous embodiment, the spacing portion fills the gap between the end surfaces. This has the advantage that physical characteristics of the gap can be tuned via the dimensions and/or material composition of the spacing portion.

In an implementation, the holding unit includes at least one shield member spacer projecting from a side surface of the holding unit so as to respectively separate two shield members. The at least one shield member spacer especially projects from the respective side surface in a direction away or opposing the magnetic core(s). In particular, the shield member spacer may project perpendicular to the respective side surface of the holding unit. This has the advantage that a magnetic short circuit between two shield members may be prevented by the shield member spacer. In addition, physical characteristics of the shielding device, such as an effect thereof on an inductance of the magnetic core(s) can be tuned by varying the dimensions, number, and/or material composition of the shield member spacer.

In an implementation, a shortest distance between the shield member and a closest edge of the respective gap is defined as L and a width of the respective gap is defined as D, where L>D. In other words, the shortest distance between the shield member and the closest edge of the respective gap is larger than the width of the respective gap. This has the advantage that magnetic short circuits can be reliably and advantageously prevented in the magnetic component.

In an implementation, the quotient L/D is between and including a maximum and a minimum. Therein, the maximum may be selected from 5, 3, and 2. In addition or alternatively thereto, the minimum may be selected from 1.1, 1.2, 1.3, 1.4, and 1.5. In addition or alternatively thereto, the quotient L/D is one of the aforementioned values. This ranges and values have the advantage that magnetic short circuits can be prevented in the magnetic component.

In at least one embodiment, the shield member overlaps at least one of the end surfaces. Therein, in an implementation, the shield member overlaps at least one end surface in a view taken from a direction lying in a plane parallel to at least one end surface. Therein, in an implementation, the shield member overlaps only one or both, or all opposing end surfaces of the magnetic core(s). In other words, in the case that the shield member overlaps two opposing end surfaces, a length of the shield member in a direction spanning the respective gap is larger than the aforementioned width D. This has the advantage that the shield member can reliably shield gap-fringing fields in the periphery of the gap.

In an implementation, the at least one shield member is a ferrite plate. This has the advantage that the shield member can reliably shield gap-fringing fields in the periphery of the gap, without increasing a likelihood of an electric short circuit in the magnetic component or producing eddy currents in the shield member.

In an implementation, the holding unit is an electrical insulator. In an implementation, the holding unit includes or consists of a plastic or ceramic material. This has the advantage that the holding unit does not conduct or generate eddy currents and thus does not generate additional heat.

In at least one embodiment, the at least one electrical winding does not surround the at least one gap. In particular, in an implementation, the at least one electrical winding does not even partially surround the gap. This has the advantage that the at least one electrical winding can be placed on the magnetic core(s) for an ideal reduction of AC losses, while the shielding device provides a shielding of fringing fields of the at least one gap.

In an implementation, at least one core plate is attached to the holding unit. Thereby, the holding unit positions the at least one core plate inside the gap for air gap distribution. Large air gaps can be distributed into small ones to reduce the amplitude of stray fields in the air gap region. Thus, eddy current losses in adjacent windings are reduced as well as electromagnetic interference in the device is minimized.

In an implementation, the core plate is formed of a ferrite material. Thereby, the core plate can be magnetized, but is not electrically conductive, i.e., is electrically insulating. Herein, the core plate can include or consist entirely of a hard ferrite material and/or a soft ferrite material. In particular, the core plate is a ferrite plate, i.e., is formed of the ferrite material and is plate-shaped.

The core plate is in particular perpendicular to the shield member(s) shielding the same gap. In an implementation, the holding unit distances the at least one core plate from both opposing end surfaces of the magnetic core.

In an implementation, more than one, for example two, or three, or four, or five, core plates are attached to a single holding unit and positioned in the same gap. Thereby, the holding unit distances the core plates from each other, e.g., by partition walls.

In an implementation, a receptacle for each core plate is formed in the holding unit. In an implementation, the receptacle is a slide-in slot for sliding the core plate.

In an implementation, the holding unit is a one-piece part that holds the shield member(s) and the core plate(s).

Embodiments of the disclosure further relates to a power converter, specifically a switched mode power converter, including at least one magnetic component mentioned above.

Figure 1B:
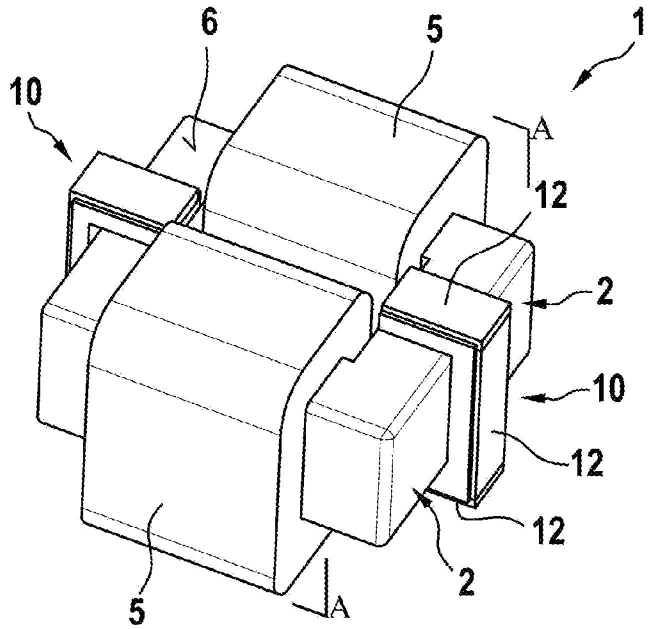

FIGS. 1*a* and 1*b* show schematic views of a magnetic component 1 according to a first embodiment of the present disclosure, respectively in a pre-assembled state and in an assembled state. In particular, FIG. 1*a* shows the magnetic component 1 in a pre-assembled state, whereas FIG. 1B shows the magnetic component 1 in an assembled state. Further, FIGS. 7*a* to 7*d* each show a schematic view of a shielding device 10 of the magnetic component 1 according to the embodiments of the magnetic component 1.

In the present embodiment, the magnetic component 1 includes two U-shaped magnetic cores 2, commonly also referred to as a "UU configuration". Further, the magnetic component 1 includes two electrical windings 5 each surrounding one of the magnetic cores 2. The U-shaped magnetic cores 2 each include two leg portions 7. The electrical winding 5 is disposed between the two leg portions 7 of each magnetic core 2.

Each leg portion 7 forms an end surface 4 of the magnetic core 2. When in an assembled state (see FIG. 1B and FIG. 8), the end surfaces 4 of the two magnetic cores 2 are gapped from each other so as to form a gap 3.

Commonly, an electric current in the electrical windings 5 generates a magnetic field in the magnetic core(s) 2. This magnetic field traverses the gap 3. However, such a gap 3 commonly generates magnetic gap-fringing fields formed in the periphery of the gap 3. These fringing fields commonly do not directly traverse the gap 3 in a straight line between the two opposing end surfaces 4 of the leg portions 7 of the magnetic cores 2, but instead extend outward from the gap. In order to mitigate or shield these fringing fields, the magnetic component 1 further includes shielding devices 10 for shielding fringing fields of the gaps 3, respectively. In other words, since the magnetic component 1 of the present embodiment includes two gaps 3, the magnetic component 1 also includes two shielding devices 10.

Figure 7A:
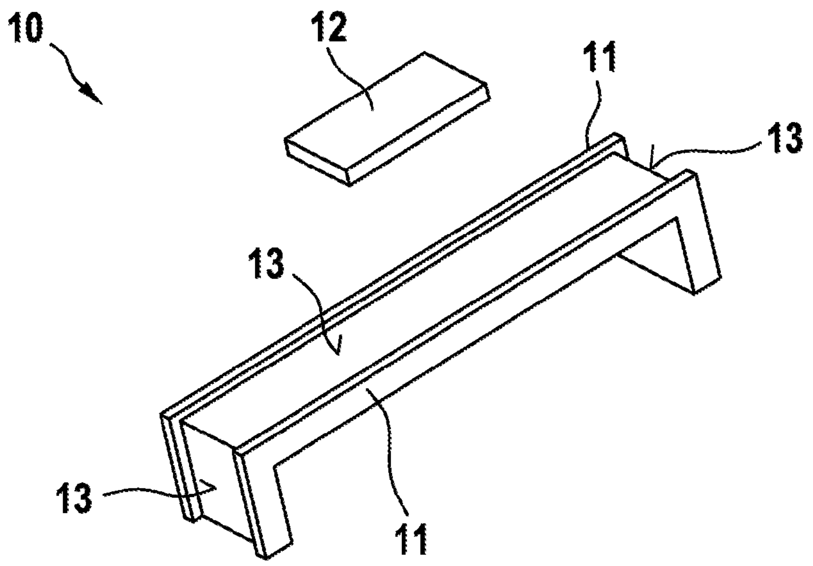
FIGS. 7*a* to 7*d* show schematic views of shielding devices of the magnetic component according to the foregoing embodiments of the present disclosure.
Figure 7B:
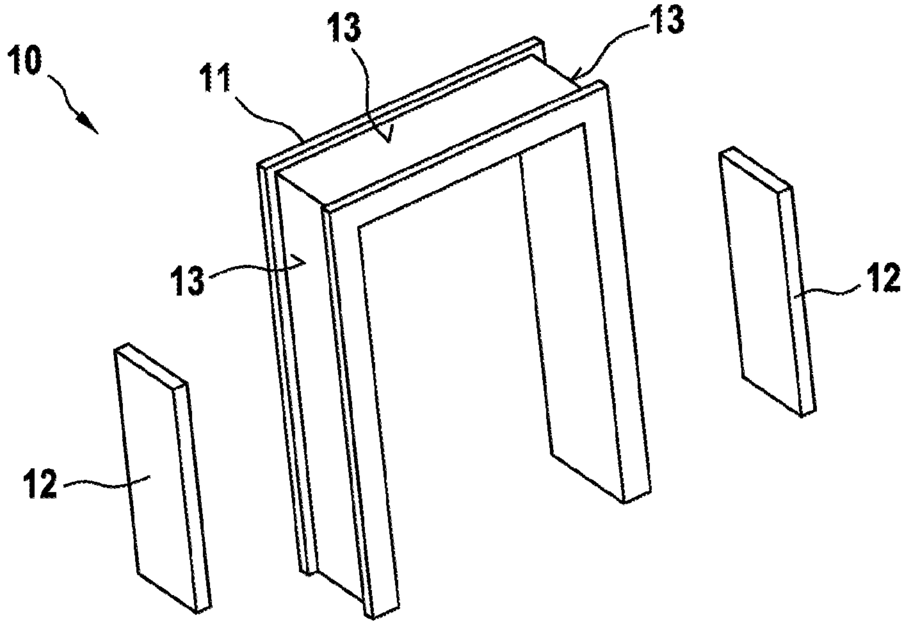
Figure 7C:
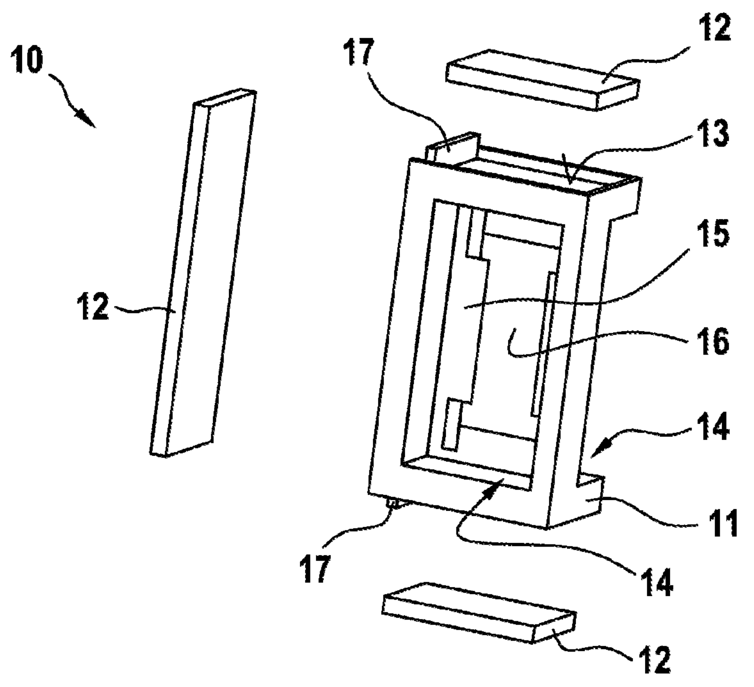

A configuration of the shielding devices 10 of the magnetic component 1 of the present embodiment is shown in more detail in FIG. 7*c*.

As can be taken from FIG. 7*c*, the shielding device 10 includes a holding unit 11 and three shield members 12.

The holding unit 11 is, in this embodiment, of a rectangular cuboid shape. Herein, the holding unit 11 includes three side surfaces 13 which are configured to each hold one shield member 12. As can be taken from FIGS. 1*a* and 1*b*, the shielding device 10 of the magnetic component of the present embodiment is attached and sandwiched between the two end surfaces 4 of two leg portions 7 of the magnetic cores 2. For this, the holding unit 11 includes two receiving portions 14 between the side surfaces 13, where each receiving portion 14 receives one end surface 4 of the magnetic core 2.

The holding unit 11 also includes a spacing portion 15 which protrudes from the side surfaces 13 into the gap 3. The spacing portion 15 separates the opposing end surfaces 4 of the magnetic cores 2. In doing so, the spacing portion 15 provides the gap 3 between the end surfaces 4 of the leg portions 7 of the magnetic cores 2. In addition, as can be taken especially from FIG. 7*c*, the spacing portion 15 is frame-shaped. That is, the spacing portion 15 is generally of a rectangular shape with an opening 16. In this embodiment, the spacing portion 15 additionally includes an L-shaped notch 18 in each of its corners. The opening 16 and the notches 18 of the spacing portion define an air gap in the gap 3 between the end surfaces 4 of the magnetic cores 2.

As mentioned above, the shielding device 10 includes three shield members 12. These shield members 12 are formed of a ferrite material. Thereby, the shield members 12 can be magnetized, but are not electrically conductive, i.e., are electrically insulating. Herein, the shield members 12 can include or consist entirely of a hard ferrite material and/or a soft ferrite material. In particular, the shield members 12 are ferrite plates, i.e., are formed of the ferrite material and are plate-shaped.

Thereby, the shield members 12 attached to the holding unit 11, which is in turn attached to and sandwiched between the end surfaces 4 of the leg portions 7 of the magnetic cores 2, can shield magnetic fringing fields generated in the gap 3, especially traversing the air gap formed by the opening 16 of the spacing portion 15 of the holding unit 11.

In addition, the holding unit 11 includes two shield member spacers 17, each projecting perpendicularly from the respective side surface 13 of the holding unit 11. These spacers 17 provide a gap between the shield members 12. A thickness of the spacer 17 in a direction parallel to an extension direction of the respective surface 13, as well as the material composition thereof can be used to tune the magnetic properties of the shielding device 10.

As will be explained in more detail with respect to FIG. 8, the thickness of the side surfaces 13 as well as other dimensions of the holding unit 11, such as height, width, depth, are adapted to provide excellent fringing field shielding by the shield members 12, while also preventing a magnetic short circuit through the shield members 12.

Figure 2A:
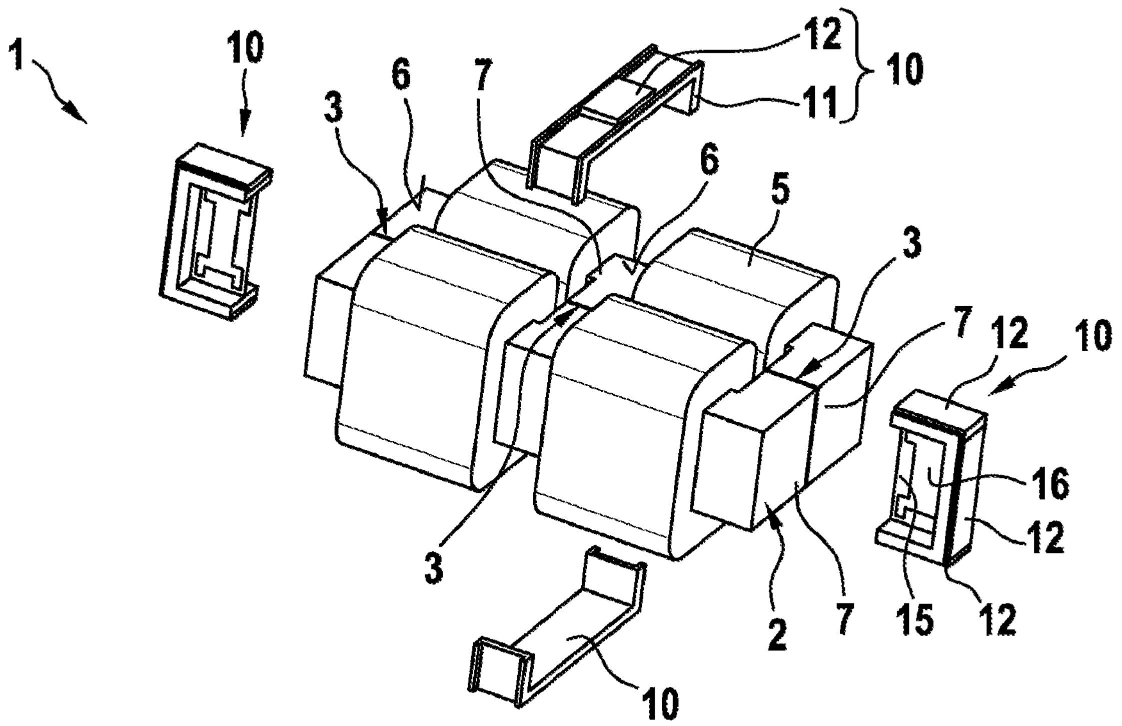
FIGS. 2*a* and 2*b* show schematic views of a magnetic component according to a second embodiment of the present disclosure, respectively in a pre-assembled state and in an assembled state.
Figure 2B:
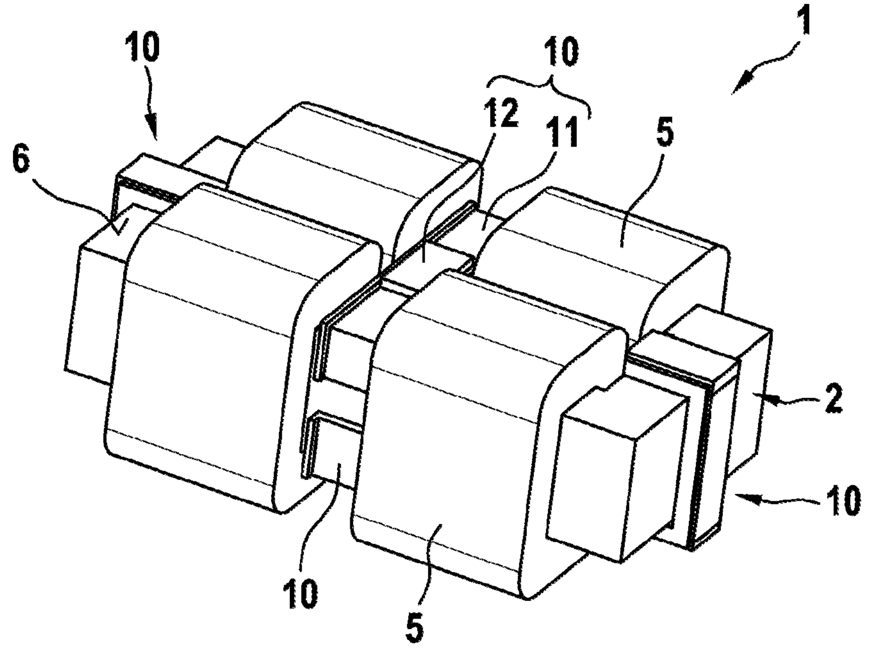

FIGS. 2*a* and 2*b* show schematic views of a magnetic component 1 according to a second embodiment of the present disclosure, respectively in a pre-assembled state and in an assembled state. In particular, FIG. 2*a* shows the magnetic component 1 in a pre-assembled state, whereas FIG. 2*b* shows the magnetic component 1 in an assembled state.

As can be taken from FIG. 2*a*, the magnetic component 1 of the present embodiment includes two magnetic cores 2, each with an E-shape, which is also commonly referred to as "EE configuration". In other words, each magnetic core 2 of the magnetic component 1 of the present embodiment includes three leg portions 7, the opposing end surfaces 4 thereof forming, in total, three gaps 3. In this embodiment, the magnetic component 1 includes two shielding devices 10, as explained with regard to the first embodiment.

In addition, the magnetic component 1 of the present embodiment includes two additional shielding devices 10, which will now be explained with regard to FIG. 7*a*.

As can be taken from FIG. 7*a*, the additional shielding device 10 includes a U-shaped holding unit 11 and one shield member 12. In this case, the holding unit 11 includes three side surfaces 13, where two of the side surfaces 13 (left and right side surfaces 13 in FIG. 7*a*) are substantially shorter than the other side surface 13 (top side surface 13 in FIG. 7*a*).

With this configuration, as can be seen in FIG. 2*a*, the holding unit 11, and thereby the entire additional shielding device 10, can be attached to an outside surface of the magnetic cores 2, where the outside surface 6 does not include the end surfaces 4 of the magnetic cores 2.

Therefore, as can be taken from FIG. 2*b*, the aforementioned additional shielding device 10 can also be attached to the outer surface 6 of the middle leg portions 7 of the magnetic cores 2. Thereby, the additional shielding device 10 can shield the gap-fringing fields which are generated in the gap 3 between the middle leg portions 7 of the two E-shaped magnetic cores 2. Further, the magnetic component 1 of the present embodiment includes a second additional shielding device 10, which is disposed on the outer surface 6 of the two magnetic cores 2 on a bottom side thereof.

The additional shielding device 10 of the present embodiment can also be attached to an outside surface 6 of the other leg portions 7 (left and right leg portions 7). In addition, the shielding device 10 can also be attached to the electrical winding(s) 5, especially on the outside thereof.

In the present embodiment, the holding unit 11 is configured to snap-fit onto the outside surface 6 of the two magnetic cores 2 and/or to the electrical winding(s) 5.

Further, the aforementioned shielding device 10 shown in FIG. 7*a* of the present embodiment can also include a spacing portion 15 (not shown). In this case, the spacing portion 15 projects from the top side surface 13 of FIG. 7*a* to the gap 3. In other words, when the holding unit 11 is snap-fit or otherwise attached to the outer surface 6 of, for example, the middle leg portion 7, the spacing portion 15 thereof may be inserted into the gap 3 between the middle leg portions 7.

Figure 3A:
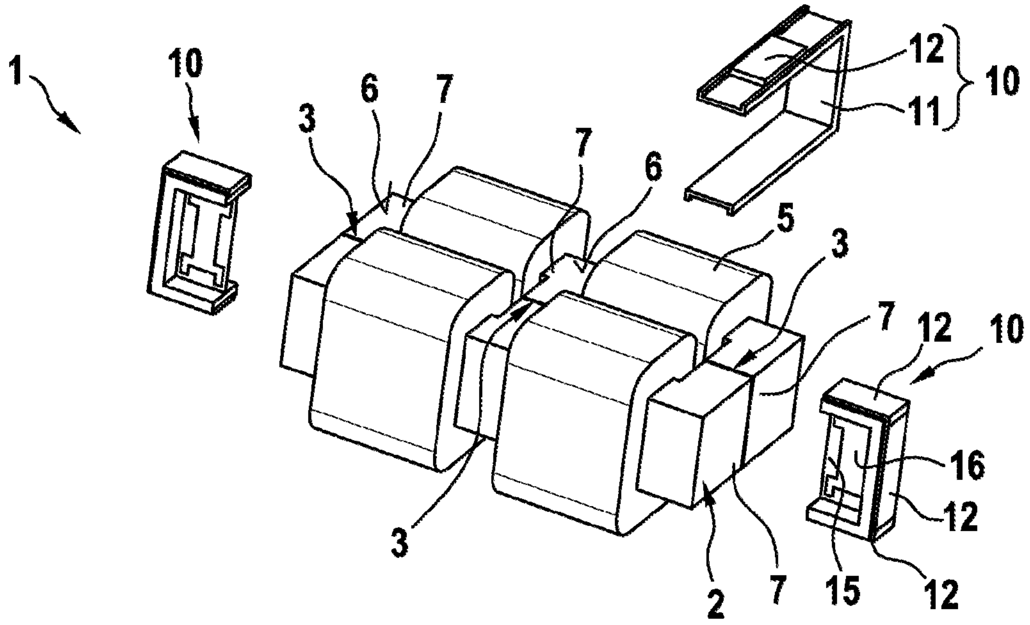
FIGS. 3*a* and 3*b* show schematic views of a magnetic component according to a third embodiment of the present disclosure, respectively in a pre-assembled state and in an assembled state.
Figure 3B:
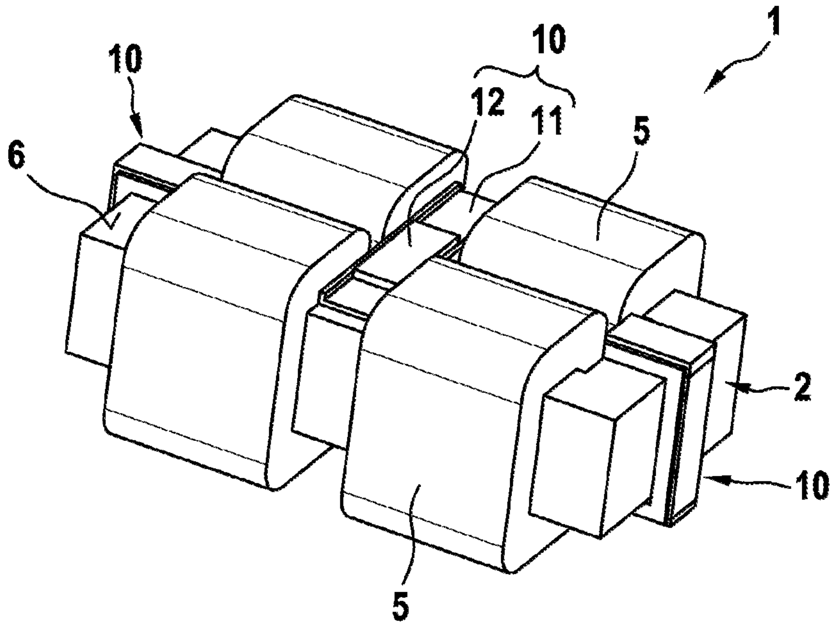

FIGS. 3*a* and 3*b* show schematic views of a magnetic component 1 according to a third embodiment of the present disclosure, respectively in a pre-assembled state and in an assembled state. In particular, FIG. 3*a* shows the magnetic component 1 in a pre-assembled state, whereas FIG. 3*b* shows the magnetic component 1 in an assembled state.

In the present embodiment, the magnetic component 1 also includes two E-shaped magnetic cores 2, as well as four electrical windings 5 respectively disposed between the three leg portions 7 of each of the magnetic cores 2.

In the present embodiment, besides two shielding devices 10 as explained with regard to the first embodiment, the magnetic component 1 also includes an additional shielding device 10; as can be seen in more detail in FIG. 7*b*, the holding unit 11 of the additional shielding device 10 is also of a U-shape. Therein, two of the side surfaces 13 (left and right side surfaces 13 of FIG. 7*b*) are at least as long or longer than the top side surface 13 of the holding unit 11. In addition, the additional shielding device 10 herein includes two shield members 12, each disposed on one of the left and right side surfaces 13.

As a comparison of FIGS. 3*a* and 3*b* shows, the additional shielding device 10 of the present embodiment is configured to slide onto the outside surfaces 6 of the two magnetic cores 2. Herein, the additional shielding device 10 is attached to the outside surfaces 6 of the middle leg portion 7.

With this configuration, only one additional shielding device 10 is employed for covering the middle gap 3 between the middle leg portions 7.

Figure 4A:
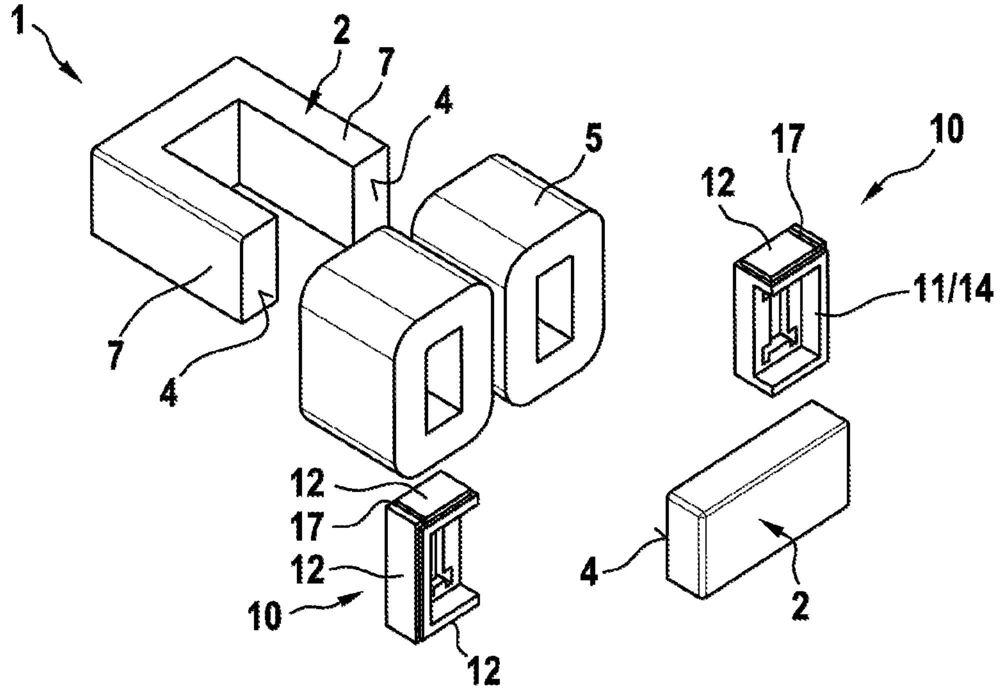
FIGS. 4*a* and 4*b* show schematic views of a magnetic component according to a fourth embodiment of the present disclosure, respectively in a pre-assembled state and in an assembled state.
Figure 4B:
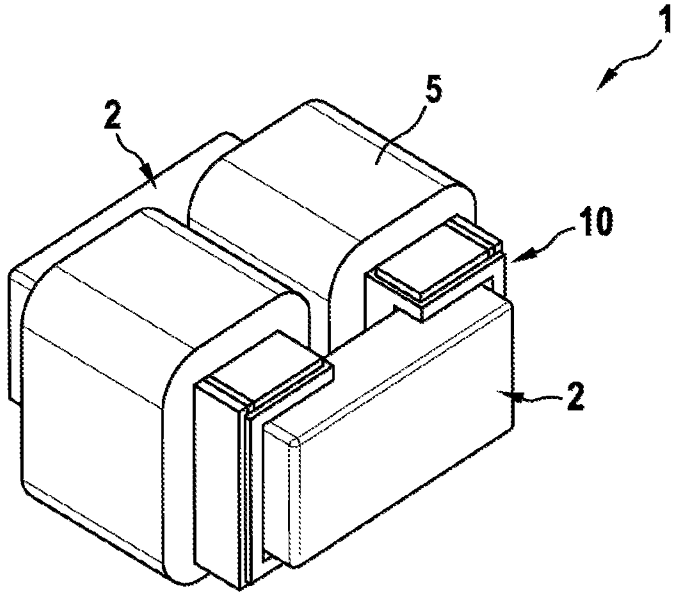

FIGS. 4*a* and 4*b* show schematic views of a magnetic component 1 according to a fourth embodiment of the present disclosure, respectively in a pre-assembled state and in an assembled state. In particular, FIG. 4*a* shows the magnetic component 1 in a pre-assembled state, whereas FIG. 4*b* shows the magnetic component 1 in an assembled state.

In the present embodiment, the magnetic component 1 includes two differently shaped magnetic cores 2. In particular, the magnetic component 1 includes a first magnetic core 2 with a U-shape, and a further magnetic core 2 with a substantially elongated rectangular shape (I-shape). This configuration is also commonly referred to as "UI configuration".

In the present embodiment, the magnetic component 1 includes two shielding devices 10 with the foregoing discussed configuration of the shielding device 10 explained with respect to the first embodiment, and FIG. 7*c*. Further, the magnetic component 1 includes two electrical windings 5, which are each provided so as to surround one leg portion 7 of the U-shaped magnetic core 2.

The shielding devices 10 of the present embodiment are sandwiched between the U-shaped magnetic core 2, and the I-shaped magnetic core 2, as also shown in FIG. 4*b*.

Figure 5A:
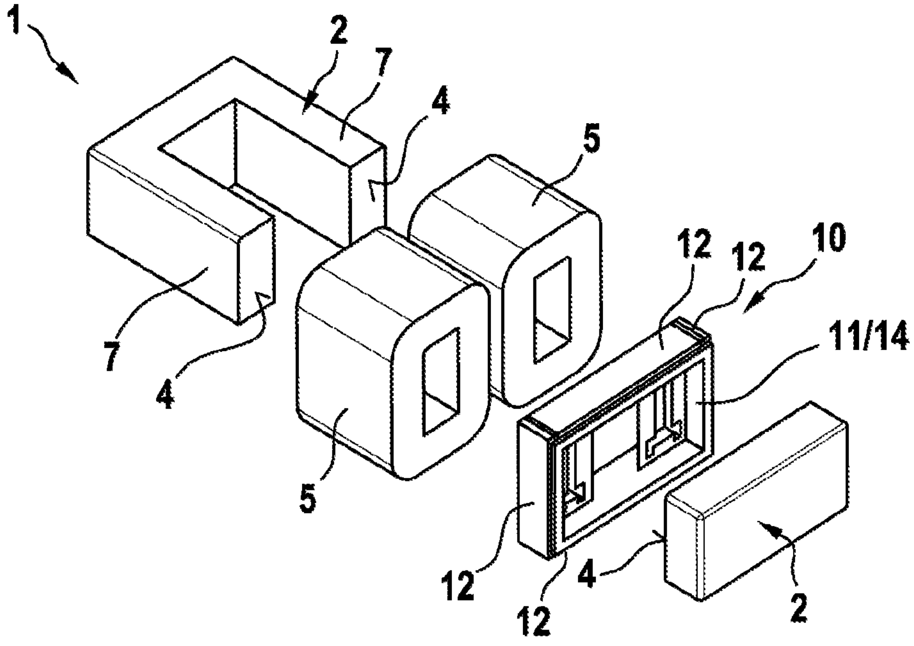
FIGS. 5*a* and 5*b* show schematic views of a magnetic component according to a fifth embodiment of the present disclosure, respectively in a pre-assembled state and in an assembled state.
Figure 5B:
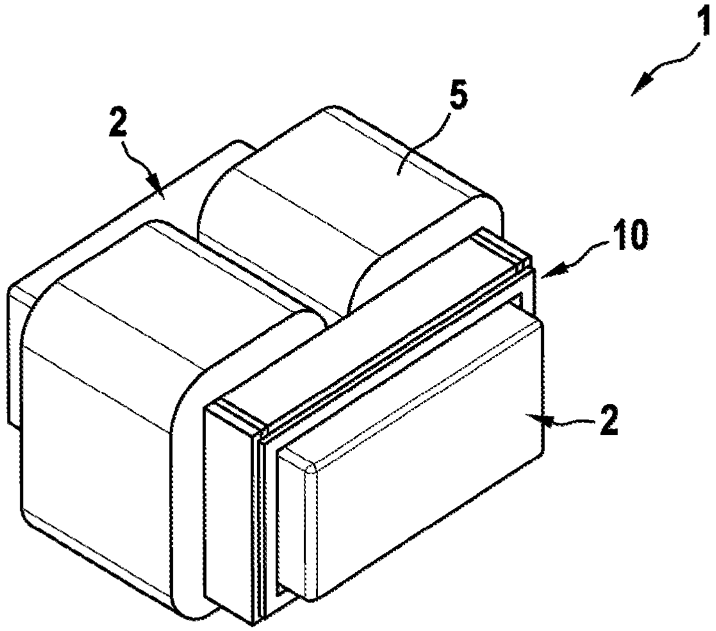

FIGS. 5*a* and 5*b* show schematic views of a magnetic component 1 according to a fifth embodiment of the present disclosure, respectively in a pre-assembled state and in an assembled state. In particular, FIG. 5*a* shows the magnetic component 1 in a pre-assembled state, whereas FIG. 5*b* shows the magnetic component 1 in an assembled state.

In the present embodiment, the magnetic component 1 herein also includes the UI configuration of the magnetic cores 2 explained above. In this embodiment, the magnetic component 1 includes one shielding device 10, which will now be explained in view of FIG. 7*d*.

Figure 7D:
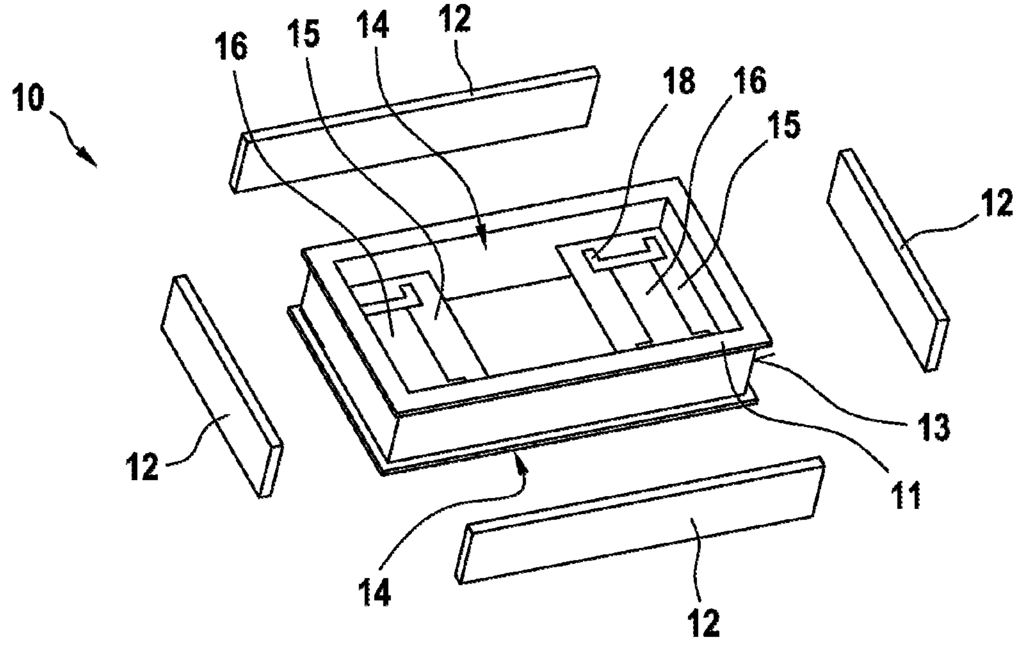

As can be taken from FIG. 7*d*, the holding unit 11 of the shielding device 10 of the present embodiment has a rectangular shape and includes two spacing portions 15, each with an opening 16. Herein, one receiving portion 14 (for example, top side of FIG. 7*d*) is configured to receive the entire I-shaped magnetic core 2. In other words, the magnetic core 2 can be inserted entirely into the receiving portion 14. Further, a second receiving portion 14 (bottom side of FIG. 7*d*) is configured to receive the two leg portions 7 of the U-shaped magnetic core 2. Therein, each leg portion 7 abuts against one spacing portion 15 of the holding unit 11.

Further, the holding unit 11 of the shielding device 10 of the present embodiment includes four side surfaces 13, each holding one shield member 12. Therein, two of the side surfaces 13 (top and bottom of FIG. 7*d*) are configured to be longer than the other two side surfaces 13 (left and right of FIG. 7*d*). However, the holding unit 11 may generally also be formed in a square shape, correlating with a possible square-shape of the (I-shaped) magnetic core 2.

Therefore, as can be taken from FIG. 5*b*, the magnetic component 1 of the present embodiment includes one single shielding device 10, which completely surrounds two gaps 3 provided between the two leg portions 7 of the U-shaped magnetic core 2 and the opposing end surface 4 of the I-shaped magnetic core 2.

Figure 6A:
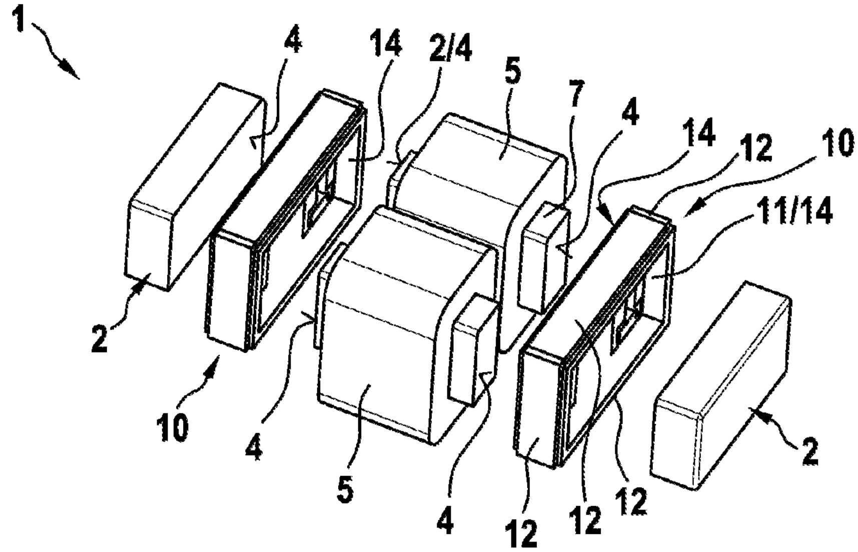
FIGS. 6*a* and 6*b* show schematic views of a magnetic component according to a sixth embodiment of the present disclosure, respectively in a pre-assembled state and in an assembled state.
Figure 6B:
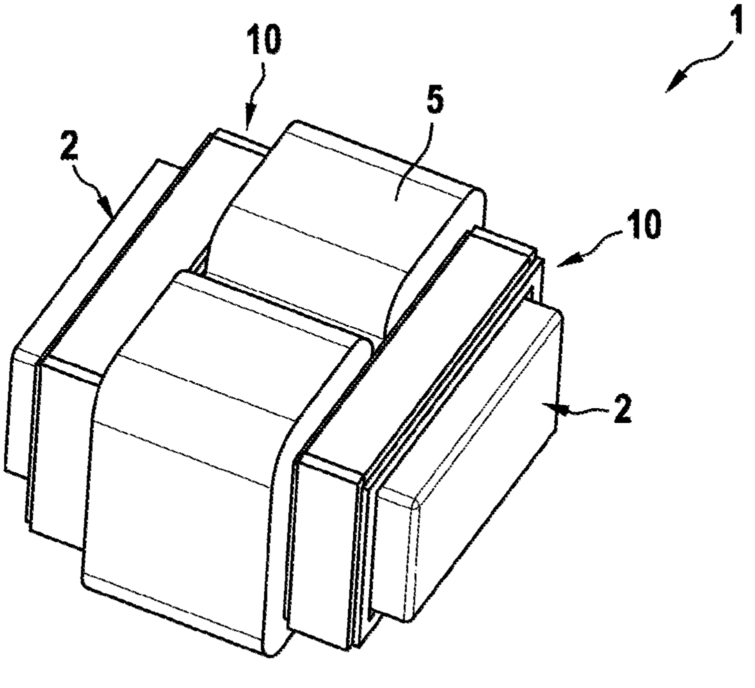

FIGS. 6*a* and 6*b* show schematic views of a magnetic component 1 according to a sixth embodiment of the present disclosure, respectively in a pre-assembled state and in an assembled state. In particular, FIG. 6*a* shows the magnetic component 1 in a pre-assembled state, whereas FIG. 6*b* shows the magnetic component 1 in an assembled state.

In the present embodiment, the magnetic component 1 includes four magnetic cores 2, where all four magnetic cores 2 are of the I-shape. Herein, the magnetic component 1 includes two shielding devices 10, in accordance with the foregoing explanation with regard to the fifth embodiment of the present disclosure, i.e. the shielding device 10 shown in FIG. 7*d*.

Herein, each shielding device 10 is attached to and sandwiched between three magnetic cores 2. Therein, the two middle magnetic cores 2, which include the electrical winding 5, are inserted into the receiving portion 14 (left receiving portion 14 of right shielding device 10, right receiving portion 14 of the left shielding device 10 in FIGS. 6*a* and 6*b*). Further, the other I-shaped magnetic cores 2 are each inserted into the other receiving portions 14 of each of the shielding devices 10.

Thereby, as can be taken from FIG. 6*b*, two shielding devices 10 cover and shield four gaps 3.

Figure 8:
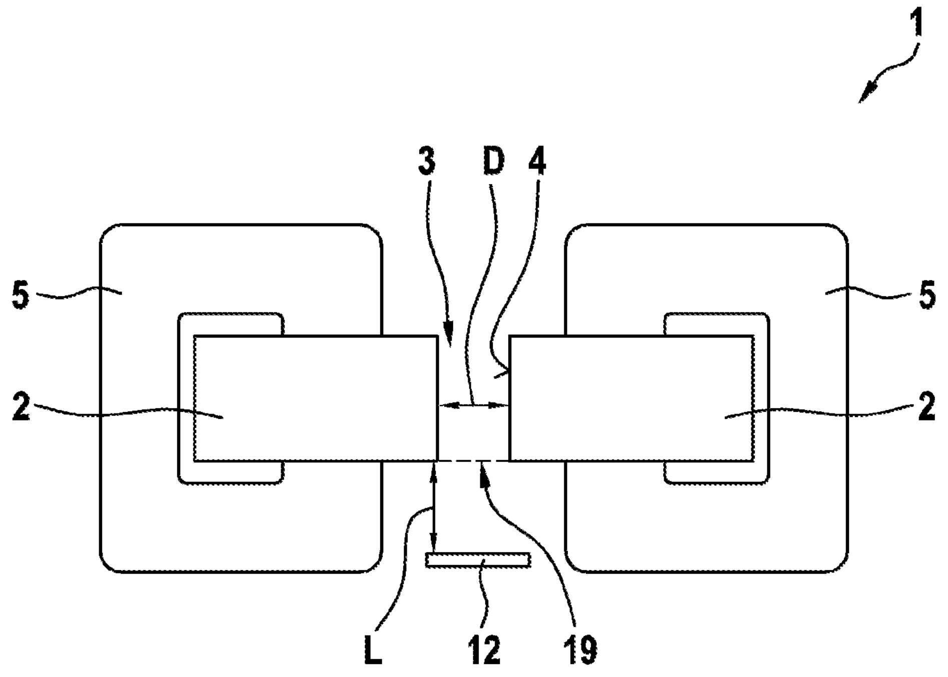
FIG. 8 shows a cross-sectional view of the magnetic component according to the foregoing embodiments of the present disclosure.

FIG. 8 is a schematic cross-sectional view of a magnetic component 1 according to the foregoing embodiments of the present disclosure. In particular, FIG. 8 shows a cross-sectional view of the magnetic component 1 of the first embodiment taken along line AA. However, the following explanations with regard to FIG. 8 may also be applied to embodiments 2 to 6 of the present disclosure.

Merely for the sake of simplicity, the holding unit 11 of the shielding device 10 is omitted, and only one shield member 12 is shown herein.

Herein, a width of the gap 3 is defined as "D". Further, a shortest distance between the shield member 12 and a closest edge 19 of the respective gap 3 is defined as "L".

In general, the holding unit 11 holds the respective shield member 12 such that L>D. For example, in the first embodiment of the present disclosure, L is equal to 1.5×D. In other words, a quotient L/D is equal to 1.5.

With this, the shield member 12 can shield gap-fringing fields in the periphery of the gap 3, without causing a magnetic short circuit.

In addition, as can be taken from FIG. 8, the shield member 12 overlaps both of the end surfaces 4 of the respective magnetic cores 2.

In all foregoing embodiments, the holding unit 11 is an electrical insulator, formed of, for example, plastic.

Further, in all foregoing embodiments, in an implementation, the electrical winding(s) 5 were shown as being disposed so as not to surround the gap(s) 3. This has the advantage that AC losses can be reduced in the magnetic component 1, while the shielding device 10 provides fringing field shielding.

In addition, in one or all of the foregoing embodiments, in an implementation, the magnetic component 1 does not include a bobbin. Instead, the electrical winding(s) 5 are wound directly on the magnetic core(s) 2.

In all of the foregoing embodiments, the holding unit 11 serves to fix the shield member(s) 12 and set the distance, in particular the distance L, between the shield member(s) 12 and the magnetic core(s) 2 in order to avoid and prevent a magnetic short circuit.

Further, the holding unit 11 serves as an air gap spacer between the opposing end surfaces 4, and thus sets the inductance of the magnetic component 1 as well as increases the saturation current of the magnetic component 1.

In addition, the holding unit 11 has the advantage that it helps guide the magnetic core(s) for better alignment during an assembly process.

The holding unit 11 may also serve as a spacer for distancing the electrical winding(s) 5 from the gap(s) 3, which reduces an AC resistance of the electrical winding(s) 5.

Further, the holding unit 11 can also serve as a spacer for distance the electrical winding(s) 5 from the magnetic core(s) 2 so as to increase creepage and clearance distances, as well as provide better insulation.

The magnetic component 1 explained above can be, for instance, used in a power converter, specifically a switched mode power converter.

The magnetic component 1 can generally include one or more of the shielding devices 10.

Figure 9:
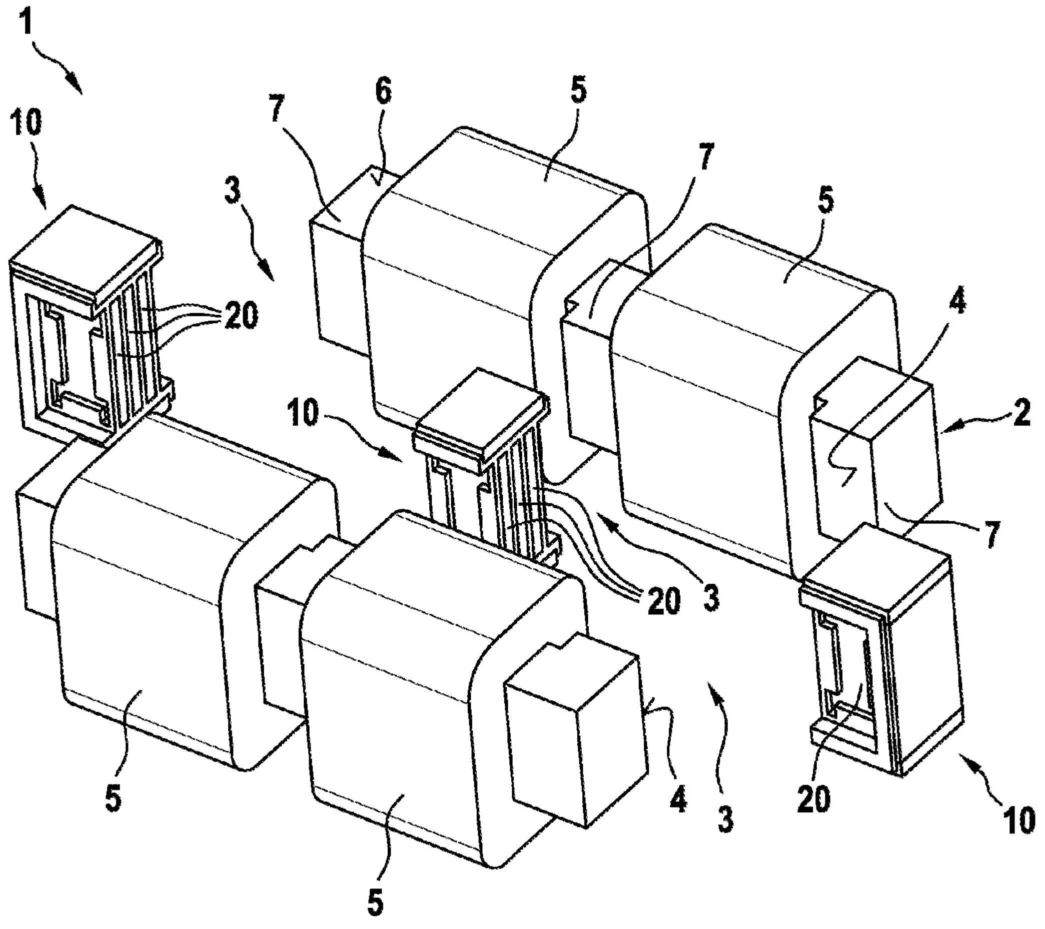
FIG. 9 shows a schematic view of a magnetic component in a pre-assembled state with core plates for air gap distribution for all embodiments.
Figure 10:
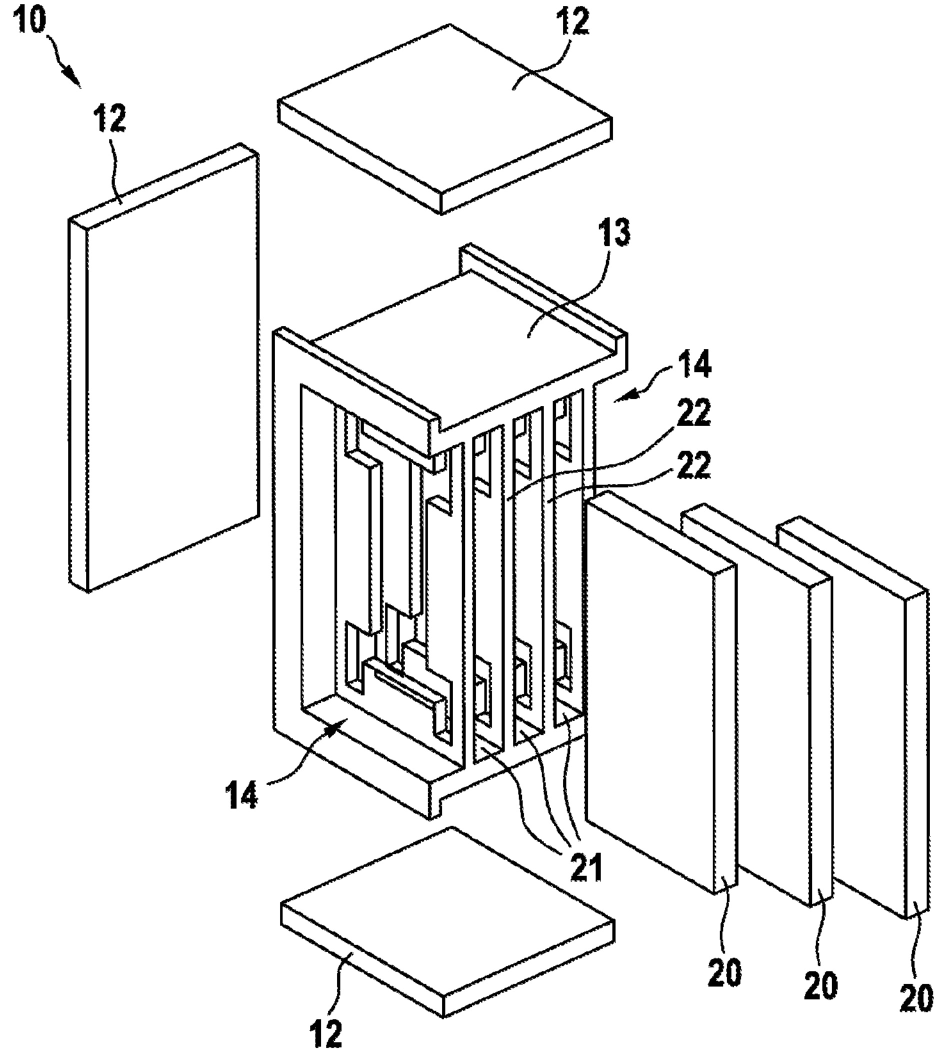
FIG. 10 shows a schematic view of the shielding device with core plates for air gap distribution for all embodiments.

FIGS. 9 and 10 show for all above mentioned embodiments, how core plates 20 can be attached to the holding unit 11 for air gap distribution. The holding unit 11 positions the core plates 20 inside the gap 3 for air gap distribution.

The core plates 20 are perpendicular to the shield members 12. The holding unit 11 distances the core plates 20 from both opposing end surfaces 4 of the magnetic core 2. Further, the holding unit 11 distances the core plates 20 from each other by partition walls 22. A receptacle 21 for each core plate 20 is formed in the holding unit 11. The receptacle 21 is a slide-in slot for sliding the core plate 20. Further, the holding unit 11 is a one-piece part that holds the shield members 12 and the core plates 20.

In summary, the magnetic component 1 of the foregoing described embodiments provides lower AC losses and higher power efficiency, better EMI behaviour of an entire device including the magnetic component 1, reduced total volume of the magnetic component 1 and thus higher device power density, a simplified production process via the multi-function holding unit 11, as well as lower material and labour costs.

What is claimed is:

1. A magnetic component, comprising:

at least one magnetic core, wherein at least one gap is formed between end surfaces of the at least one magnetic core;

at least one electrical winding surrounding at least a part of the at least one magnetic core and not surrounding the at least one gap; and a shielding device for shielding fringing fields of the at least one gap, the shielding device comprising:

a holding unit attached to at least one of the at least one magnetic core and the at least one electrical winding in a periphery of the at least one gap; and at least one shield member attached to the holding unit; wherein the at least one shield member is configured to shield gap-fringing fields in the periphery of the at least one gap from an outer side of the holding unit.

2. The magnetic component according to claim 1, wherein the holding unit comprises at least one side surface configured to at least partially surround the gap and to hold the at least one shield member.

3. The magnetic component according to claim 1, wherein the holding unit is attached between the end surfaces of the at least one magnetic core.

4. The magnetic component according to claim 3, wherein the holding unit comprises: a receiving portion, located between multiple side surfaces and configured to receive one of the end surfaces; and a further receiving portion, located between the multiple side surfaces, and configured to receive an opposing end surface.

5. The magnetic component according to claim 1, wherein the holding unit is attached only to outside surface(s) not including an end surface(s) of the at least one magnetic core.

6. The magnetic component according to claim 5, wherein the holding unit is snap-fit onto the outside surfaces of the at least one magnetic core.

7. The magnetic component according to claim 2, wherein the holding unit comprises at least one spacing portion protruding from the at least one side surface into the gap, the at least one spacing portion is configured to separate the at least two end surfaces opposite to each other with respect to the spacing portion.

8. The magnetic component according to claim 7, wherein the spacing portion is frame-shaped, and wherein an air gap is defined in the gap between the end surfaces by an opening of the frame-shaped spacing portion.

9. The magnetic component according to claim 7, wherein the spacing portion fills the gap between the end surfaces.

10. The magnetic component according to claim 1, wherein the holding unit comprises at least one shield member spacer projecting from a side surface of the holding unit so as to respectively separate two shield members.

11. The magnetic component according to claim 1,
wherein a shortest distance between the shield member and a closest edge of the respective gap is defined as L and a width of the respective gap is defined as D, and L>D.

12. The magnetic component according to claim 11, wherein a quotient L/D is between and including a maximum and a minimum, wherein the maximum is selected from 5, 3, and 2, and the minimum is selected from 1.1, 1.2, 1.3, 1.4, and 1.5, or the quotient L/D is one of the above.

13. The magnetic component according to claim 1, wherein the shield member overlaps at least one of the end surfaces.

14. The magnetic component according to claim 1, wherein the at least one shield member is a ferrite plate.

15. The magnetic component according to claim 1, wherein the holding unit is an electrical insulator.

16. The magnetic component according to claim 15, wherein the holding unit comprises or consists of a plastic or ceramic material.

17. The magnetic component according to claim 1, wherein at least one core plate is attached to the holding unit and positioned by the holding unit inside the gap.

18. The magnetic component according to claim 17, wherein a receptacle is formed for each core plate in the holding unit, and a partition wall is provided in the holding unit and configured to distance the at least one core plate from each other.

19. A power converter, comprising at least one magnetic component according to claim 1.

* * * * *